United States Patent
Saltz

(10) Patent No.: US 7,503,064 B2
(45) Date of Patent: *Mar. 10, 2009

(54) FRAMEWORK FOR PROVIDING A SECURITY CONTEXT AND CONFIGURABLE FIREWALL FOR COMPUTING SYSTEMS

(75) Inventor: Michael K. Saltz, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 633 days.

This patent is subject to a terminal disclaimer.

(21) Appl. No.: 10/772,035

(22) Filed: Feb. 3, 2004

(65) Prior Publication Data

US 2005/0138354 A1    Jun. 23, 2005

Related U.S. Application Data

(63) Continuation-in-part of application No. 10/743,929, filed on Dec. 22, 2003.

(51) Int. Cl.
    *G06F 9/00* (2006.01)
(52) U.S. Cl. .................. 726/11; 726/4; 726/9; 713/153
(58) Field of Classification Search ........................ None
    See application file for complete search history.

(56) References Cited

U.S. PATENT DOCUMENTS

| | | | |
|---|---|---|---|
| 5,751,813 | A | 5/1998 | Dorenbos |
| 6,092,191 | A | 7/2000 | Shimbo et al. |
| 6,092,202 | A | 7/2000 | Veil et al. |
| 6,256,690 | B1 | 7/2001 | Carper |
| 6,317,838 | B1 | 11/2001 | Baize |
| 6,353,886 | B1 | 3/2002 | Howard et al. |
| 6,470,447 | B1 | 10/2002 | Lambert et al. |
| 6,526,506 | B1 | 2/2003 | Lewis |
| 6,542,993 | B1 | 4/2003 | Erfani |
| 6,553,492 | B1 | 4/2003 | Hosoe |
| 6,678,822 | B1 | 1/2004 | Morar et al. |
| 7,127,605 | B1* | 10/2006 | Montgomery et al. ........ 713/150 |
| 2001/0007146 | A1 | 7/2001 | Hansmann et al. |
| 2002/0188869 | A1* | 12/2002 | Patrick ........................ 713/201 |
| 2003/0189092 | A1 | 10/2003 | Takano |

OTHER PUBLICATIONS

PCT International Search Report, International Application No. PCT/US04/41303, Apr. 27, 2005.
PCT Written Opinion of the International Searching Authority, International Application No. PCT/US04/41303, Apr. 27, 2005.
"Letter and Second Opinion," by Trakker Technologies, Inc. Jul. 5, 2005.

* cited by examiner

*Primary Examiner*—Pramila Parthasarathy
(74) *Attorney, Agent, or Firm*—Sonnenschein Nath & Rosenthal LLP

(57) ABSTRACT

Techniques for providing security context and firewalls in computing environments are disclosed. The security context includes cryptographic operations that can further enhance security. A security context block that includes a security context identification (ID) and a cryptographic system is disclosed. The security context identification (ID) can be provided for and assigned to various components of the computing system as means for security identification. Using the cryptographic system, various cryptographic operations can be performed on the security context identification (ID) to further enhance security. For example, security identifiers can be authenticated before it is presented to a firewall. After, successful authentication, the firewall can be used to determine whether the security identifier identifies an associate with access privileges.

31 Claims, 13 Drawing Sheets

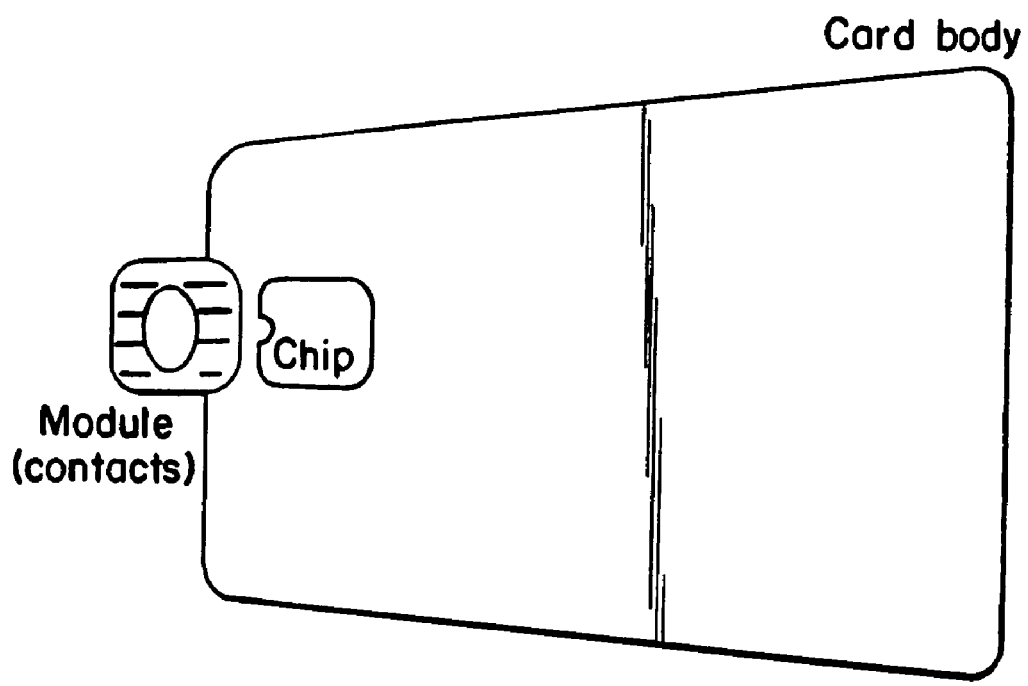
(RELATED ART) Fig. 1A
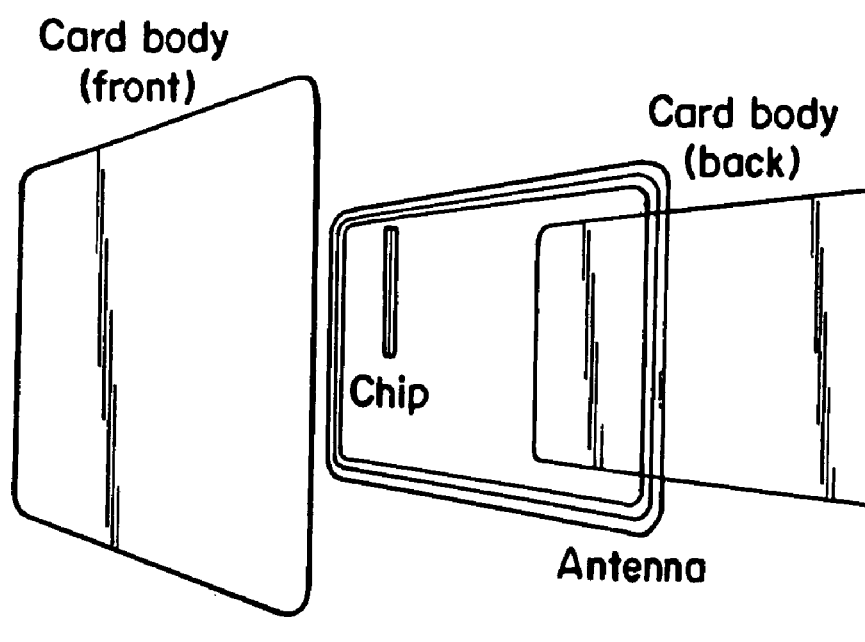
(RELATED ART) Fig. 1B

← 370

| Firewall Control Value 1 | Firewall Control Value 2 |
| --- | --- |
| 372 | 376 |
| Firewall Control Indicator 1 | Firewall Control Indicator 2 |
| 374 | 378 |

Fig. 3I

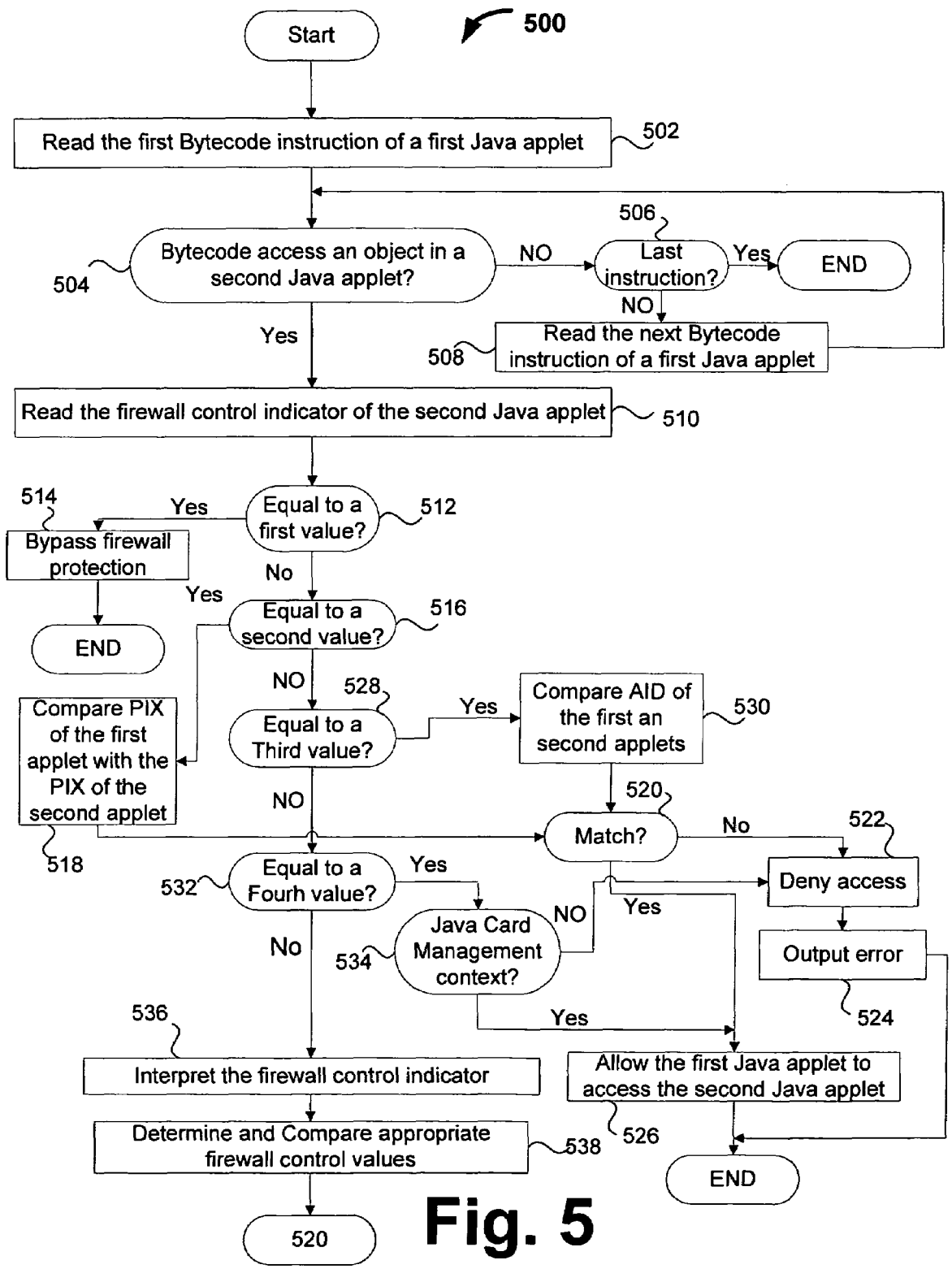

602

| Associate Security Identification |
| 604 |
| Access operations |
| 606 |

| ID 1 | ID 2 | ID 3 | ID 4 |
|------|------|------|------|
| Read | Read, Write, Delete | Create, Execute | Read, Update |

Fig. 6B

```
Fire WallContext {
Context ID;
Associated ID AssociatedIDAccess[ ];
}

AssociatedID {
ValidID
AccessMask;
}
```

| Context ID Value |
| 632 |
| Control Value |
| 634 |
| Associate ID |
| 636 |
| Fire wall Control Value |
| 638 |
| Fire wall Control indicator |
| 640 |
| Associate Identification |
| 642 |
| Access operations |
| 644 |
| Authenticated ID |
| 646 |

Fig. 6D

```
Fire WallContext {
Context ID;
boolean control-value-access;
boolean Assocaite-ID-access;
byte[ ] Control-Val;
byte Control-Indictor;
Associated ID AssociatedIDAccess[ ];
}

AssociatedID {
ValidID
AccessMask;
boolean Authenticated-Already
}
```

Fig. 6E

```
class SecurityContext{
        ContextID;
        securityEnvironment[ ];
        data[ ];
        operations;
        securityContext[] (Nested?)
        }

SecurityEnvironment{
        KeyID[ ];
        Key[ ];
        keyMangementInfo[ ];
        Algorithm[ ];
}

Key {
        ID writeKey;
        ID readKey;
        ID deleteKey;
        byte [ ] keyMaterial;
}

Operations {
        sign,
        verify;
        encrypt;
        decrypt;
        authenticate;
        }
```

Fig. 7C

FRAMEWORK FOR PROVIDING A SECURITY CONTEXT AND CONFIGURABLE FIREWALL FOR COMPUTING SYSTEMS

CROSS-REFERENCE TO RELATED APPLICATIONS

The present application is a continuation-in-part of co-pending U.S. Patent Application entitled "FRAMEWORK FOR PROVIDING A CONFIGURABLE FIREWALL FOR COMPUTING SYSTEMS", Ser. No. 10/743,929, filed Dec. 22, 2003, from which priority under U.S.C. §120 is claimed, and which is hereby incorporated herein by reference in its entirety.

BACKGROUND

The present invention relates generally to computing systems, and more particularly, to techniques for providing secure computing systems.

Unlike a typical general-purpose desktop computer, some computing devices are mobile, highly specialized for a particular application. These mobile devices typically operate with relatively less memory, and/or processing power. By way of an example, a smart card is representative of a mobile computing device. A smart card can be highly specialized and provided for a particular application (e.g., security). A smart card is also an example of a computing environment where the amount of memory and processing power that can be provided is typically not as much as those provided for general-purpose desktop. As such, a smart card may provide a good example for discussion and will be discussed further.

Smart cards were introduced about two decades ago in the form of memory cards that were used to store critical information (e.g., phone cards). The smart cards today are, however, much more sophisticated than those initially introduced. Today, a smart card can have an embedded integrated circuit (IC). The smart card can, for example, be a plastic card that includes the embedded integrated circuit (IC). A smart card can resemble a credit card. Moreover, a smart can be used for highly sensitive applications (e.g., banking, security). As a result, extensive efforts have been made by a number of entities to develop smart cards that are secure.

Smart-card technology is an industry standard defined and controlled by the Joint Technical Committee 1 (JTC1) of the International Standards Organization (ISO) and the International Electronic Committee (IEC). The series of international standards ISO/IEC 7816, introduced in 1987 with its latest update in 2003, defines various aspects of a smart card, including physical characteristics, physical contacts, electronic signals and transmission protocols, commands, security architecture, application identifiers, and common data elements.

In some areas of use, smart cards are just memory cards that merely provide protected non-volatile storage. More advanced smart cards, however, have both microprocessors and memory, and can be used for secure processing and storage. Smart cards can operate without a battery (i.e. become active only when connected with a card reader). When connected, after performing a reset sequence the card remains passive, waiting to receive a command request from a client (host) application. Smart cards can be contact or contactless. As the names imply, contact smart cards work by communicating via physical contact between a card reader and the smart card's 8-pin contact, while contactless smart cards communicate by means of a radio frequency signal, with a typical range of less than 2 feet. The radio communication of contactless smart cards is based on technology similar to Radio Frequency ID (RFID) tags used in stores to counter theft and track inventory. FIG. 1 depicts contact and contactless smart cards. FIGS. 1A and 1B respectively depict contact and contactless smart cards.

Given the popularity of mobile devices, it is desirable to develop programming environments that are better suited for them. These programming environments, among other things, should be secure.

SUMMARY

As noted above, given the popularity of mobile devices, it is desirable to develop programming environments that are better suited for them. These programming environments typically should operate with relatively limited resources (processing power and/or memory) and/or provide highly specialized functionality.

As a platform independent programming environment, Java™ technology, among other things, is well suited for such environments. Java™ is a programming language that is well suited for use in the distributed environment (e.g., Internet). It was designed to have the "look and feel" of the C++ language, but it can be simpler to use than C++ and enforces an object-oriented programming model. Java™, among other things, can be used to create complete applications that may run on a single computer or be distributed among servers and clients in a network. It can also be used to build a small application module or applet for use as part of a Web page. Applets make it possible for a Web page user to interact with the page.

Java™ platform includes the Java Card™ technology. The Java Card™ technology adapts the Java™ programming platform for use on smart cards and other mobile devices whose environments are highly specialized and/or operate under more severe memory and/or processing constraints relative to, for example, a general-purpose desktop computing environment. Java Smart Cards™ are useful in many different areas. They can, for example, be used to add authentication and secure access to information systems that require a high level of security. Information stored in Java Smart Cards™ are portable. With Java Card™ technology, valuable and sensitive personal information such as medical history, credit card numbers, or electronic cash balances can be carried in a medium that is compact, yet secure.

Java Card™ technology also exists in forms other than smart cards, such as smart buttons and USB tokens (illustrated in FIGS. 1C and 1D). Similar to a smart card, the smart button and USB token can be used to authenticate users or carry sensitive information, for example. Smart buttons can include a battery and are typically contact-based, while USB tokens can be plugged directly into the USB port of a PC with no need for a contact or contactless reader. In any case, these other forms can provide the same programming capabilities as smart cards and have tamper-resistance properties.

In addition to the protections provided by the Java™ programming environment, the Java Card™ technology provides an application (or applet) firewall as an added runtime-enforcement protection. The firewall essentially partitions the Java Card™ platform into separate protected object spaces (or "contexts"). In other words, the firewall provides a boundary between one context and another context. In this environment, separate protected spaces (or context) may not be able to access each other.

It should be noted that applets are typically packaged together in what can be referred to a Java™ package. It should also be noted that all applets within a single Java™ package share the same context. This means that there is no firewall between the applets within the same package. Moreover, the firewall boundaries are dependent on how the applet are packaged. This means that it may not be possible to define firewall boundaries based on individual applets. This firewall implementation can be referred to as a package-based firewall environment.

In a package-based firewall environment, allowing applets that are not in the same package to access each other requires relatively complex techniques. By way of example, a shareable interface has to be implemented for an applet that can be accessed by other applets (e.g., JCSystem.getAppletShareableInterfaceObject( ) method). Accordingly, a first applet can request access to a second applet's sharable interface. Then, on behalf of the first applet, the Java Card Runtime Environment™ (JCRE) can ask the second applet for its shareable interface by invoking a method (e.g., getSharableInterfaceObject( ) method). If access is allowed by the second applet, then the first applet has to obtain a reference to the second applet.

In view of the foregoing, alternative techniques for providing a secure computing environment would be useful. To achieve these and other objectives of the invention, frameworks for providing a configurable firewall are disclosed. The configurable firewall provides a control block that can be used to define and control access privileges between various components of the computing environment. As such, the firewall control block can be used to determine whether one component should be granted access to another component in the computing environment.

By way of example, a control block can be provided for each Java™ application (or applet) in a Java Card™ computing environment in accordance with one embodiment of the invention. This allows a flexible environment where firewall boundaries can be selectively configured and defined for each individual applet. Firewall boundaries need not be dependent on how applets are packaged. This also provides a flexible environment where firewall boundaries can be defined in such a way that each applet can allow access to a desired set of applets and vice a versa.

In addition, it will be illustrated that the firewall control block can be implemented using a variety of techniques that may be suitable for different system requirements (e.g., processing speed, memory). As such, the configurable firewall is useful for implementing security for various computing systems, especially those that operate with relatively limited processing power and/or provide highly specialized functionality (e.g., smart cards). As will also be illustrated, numerous forms of the firewall control block can be implemented and a variety of techniques can be used to implement security.

By way of example, in some embodiments, a firewall control value and indicator is used to implement the firewall control block. While in other embodiments, an associate security identification is used to implement the firewall control block. An associate security identification can identify one component of the computing system as an associate with access privileges with respect to other components. In addition, access privilege can further be defined by "access operations" for each of the associated components. As a result, associate security identification and access operations provided in a firewall control block can be used to determine whether a first component should be granted access to perform a particular operation (e.g., read, write) on another component. Other aspects of the invention provide the techniques for implementing security using various firewall control blocks.

Still other aspects of the invention provide security context for the computing environment. The security context includes cryptographic operations that can further enhance security for the computing system. In one embodiment, a security context block is provided. (See, for example, FIG. 6A.) The security context block includes a security context identification (ID) and a cryptographic system. As will be appreciated, the security context identification (ID) can be provided for and assigned to various components of the computing system. Using the cryptographic system, various cryptographic operations can be performed on the security context identification (ID) to further enhance security. These operations can, for example, be authentication, digital signatures, verification, encryption and decryption. By way of example, the cryptographic system can be used to authenticate a component that presents a security context identification (ID) (i.e., an entity that claims to be the rightful owner of the security context identification. The authentication process, for example, can be achieved by a verification process that uses a set of public and/or private keys to ensure (see, for example, FIG. 8). In general, the cryptographic system can be used to perform any cryptographic operation (e.g., encrypting messages transmitted between various components).

Similar to a firewall security block, a security context block can be provided for various components of the computing system (e.g., Java™ applets, Java™ packages). In fact, it is possible to provide both a firewall security block and security context block for a single component. Furthermore, it should be noted that a security context identification (ID) provided in a security context block can be used as a security identification that is presented to a firewall control block. As will be appreciated, cryptographic operations (e.g., authentication) can be performed before the security context identification (ID) is presented to the firewall control block. This means that a security Identification can first be authenticated before it is presented to the firewall control block. After successful authentication, the firewall control block can be used to determine whether the security Identification identifies an associated component with access privileges. Thus, the combination of the firewall control block and security context block can further enhance security of the computing environments.

The invention can be implemented in numerous ways, including a system, an apparatus, a method or a computer readable medium. Several embodiments of the invention are discussed below.

BRIEF DESCRIPTION OF THE DRAWINGS

The present invention will be readily understood by the following detailed description in conjunction with the accompanying drawings, wherein like reference numerals designate like structural elements, and in which:

FIGS. 1A, 1B, 1C and 1D depict a mobile computing device.

FIGS. 3A-3I illustrate firewall control blocks in accordance with several embodiments of the invention.

FIG. 5 illustrates a method for providing a firewall in Java Card™ environment in accordance with one embodiment of the invention.

FIGS. 6A-6E illustrate control blocks in accordance with several other embodiment of the invention.

FIGS. 7A-7C each depict a security context block in accordance with one embodiment of the invention.

DETAILED DESCRIPTION OF THE INVENTION

Figure 1C:
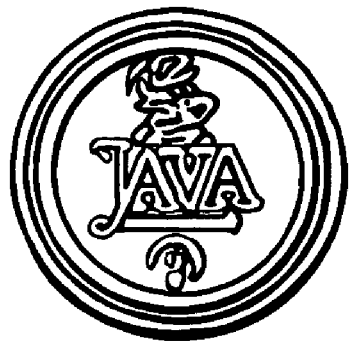
Figure 1D:
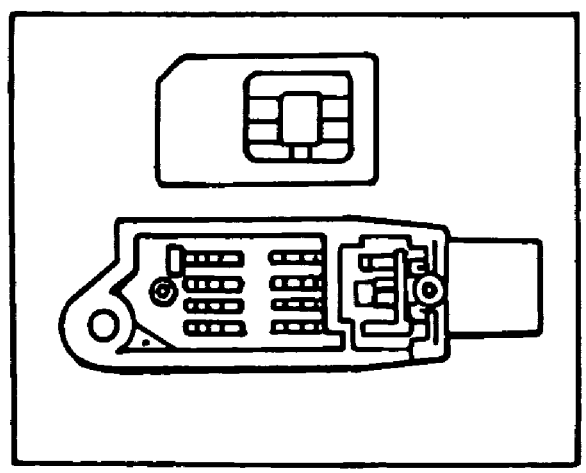

As described in the background section, given the popularity of mobile devices, it is desirable to develop programming environments that are better suited for them. These programming environments typically operate with relatively limited resources (processing power and/or memory) and/or provide highly specialized functionality.

As a platform independent programming environment, Java™ technology, among other things, is well suited for such environments. Java™ is a programming language that is well suited for use in the distributed environment (e.g., Internet). It was designed to have the "look and feel" of the C++ language, but it is simpler to use than C++ and enforces an object-oriented programming model. Java™ can be used to create complete applications that may run on a single computer or be distributed among servers and clients in a network. It can also be used to build a small application module or applet for use as part of a Web page. Applets make it possible for a Web page user to interact with the page.

Java™ platform includes the Java Card™ technology. The Java Card™ technology adapts the Java™ programming platform for use on smart cards and other mobile devices whose environments are highly specialized and/or operate under more severe memory and/or processing constraints relative to, for example, a desktop computing environment. Java Smart Cards™ are useful in many different areas. They can be used to add authentication and secure access to information systems that require a high level of security. Information stored in Java Smart Cards™ is portable. With Java Card™ technology valuable and sensitive personal information such as medical history, credit card numbers, or electronic cash balances can be carried in a medium that is compact, yet secure.

Java Card™ technology also exists in form factors other than smart cards, such as smart buttons and USB tokens (illustrated in FIGS. 2A and B). These can be used much as smart cards are, to authenticate users or carry sensitive information, for example. Smart buttons include a battery and are contact-based, while USB tokens can be plugged directly into the USB port of a PC with no need for a contact or contactless reader. Both provide the same programming capabilities as smart cards and have tamper-resistance properties.

In addition to the protections provided by the Java™ programming environment, the Java Card™ technology provides an application (or applet) firewall as an added runtime-enforcement protection. The firewall essentially partitions the Java Card™ platform into separate protected object spaces (or "contexts"). In other words, the firewall provides a boundary between one context and another context. In this environment, separate protected spaces (or context) may not be able to access each other.

It should be noted that applets are typically packaged together in what can be referred to as a Java™ package. It should also be noted that all applets within a single Java™ package share the same context. This means that there is no firewall between the applets within the same package. Moreover, firewall boundaries are dependent on how the applets are packaged. This means that it may not be possible to define firewall boundaries on a per applet bases. This firewall implementation can be referred to as a package-based firewall environment.

In a package-based firewall environment, allowing applets that are not in the same package to access each other requires relatively complex techniques. By way of example, a shareable interface has to be implemented for an applet that can be accessed by other applets (e.g., JCSystem.getAppletShareableInterfaceObject( ) method). Accordingly, a first applet can request access to a second applet's sharable interface. Then, on behalf of the first applet, the Java Card Runtime Environment™ (JCRE) can ask the second applet for its shareable interface by invoking a method (e.g., getShareableInterfaceObject( ) method). If access is allowed by the second applet, then the first applet has to obtain a reference to the second applet.

In view of the foregoing, alternative techniques for providing a secure computing environment would be useful. To achieve these and other objectives of the invention, frameworks for providing a configurable firewall are disclosed. The configurable firewall provides a firewall control block as a mechanism to implement and control access privileges between various components of the computing environment. As such, the firewall control block can be used to determine whether one component can access another component in the computing environment based on the access privileges defined in the firewall control block.

By way of example, a control block can be provided for each Java™ application (or applet) in a Java Card™ computing environment in accordance with one embodiment of the invention. This allows a flexible environment where firewall boundaries can be selectively configured and defined for each individual applet. Firewall boundaries need not be dependent on how applets are packaged. This also provides a flexible environment where firewall boundaries can be defined in such a way that each applet can allow access to a desired set of applets and vice a versa.

In addition, it will be illustrated that the firewall control block can be implemented using a variety of techniques that may be suitable for different system requirements (e.g., processing speed, memory). As such, the configurable firewall is useful for implementing security for various computing systems, especially those that operate with relatively limited processing power and/or provide highly specialized functionality (e.g., smart cards). As will also be illustrated, numerous forms of the firewall control block can be implemented and a variety of techniques can be used to implement security.

By way of example, in some embodiments, a firewall control value and indicator is used to implement the firewall control block. While in other embodiments, an associate security identification is used to implement the firewall control block. An associate security identification can identify one component of the computing system as an associate with access privileges with respect to other components. In addition, access privilege can further be defined by "access operations" for each of the associated components. As a result, associate security identification and access operations provided in a firewall control block can be used to determine whether a first component should be granted access to perform a particular operation (e.g., read, write) on another component. Other aspects of the invention provide the techniques for implementing security using various firewall control blocks.

Still other aspects of the invention provide security context for the computing environment. The security context includes cryptographic operations that can further enhance security for the computing system. In one embodiment, a security context block is provided. (See, for example, FIG. 6A.) The security context block includes a security context identification (ID) and a cryptographic system. As will be appreciated, the security context identification (ID) can be provided for and assigned to various components of the computing system. Using the cryptographic system, various cryptographic operations can be performed on or on behalf of the security context identification (ID) to further enhance security. These operations can, for example, be authentication, digital signatures, verification, encryption and decryption. By way of example, the cryptographic system can be used to authenticate a component that presents a security context identification (ID) (i.e., an entity that claims to be the rightful owner of the security context identification. The authentication process, for example, can be achieved by a verification process that uses a set of public and/or private keys (see, for example, FIG. 8). In general, the cryptographic system can be used to perform any cryptographic operation (e.g., encrypting messages transmitted between various components).

Embodiments of the invention are discussed below with reference to FIGS. 1-9. However, those skilled in the art will readily appreciate that the detailed description given herein with respect to these figures is for explanatory purposes only as the invention extends beyond these limited embodiments.

Figure 2:
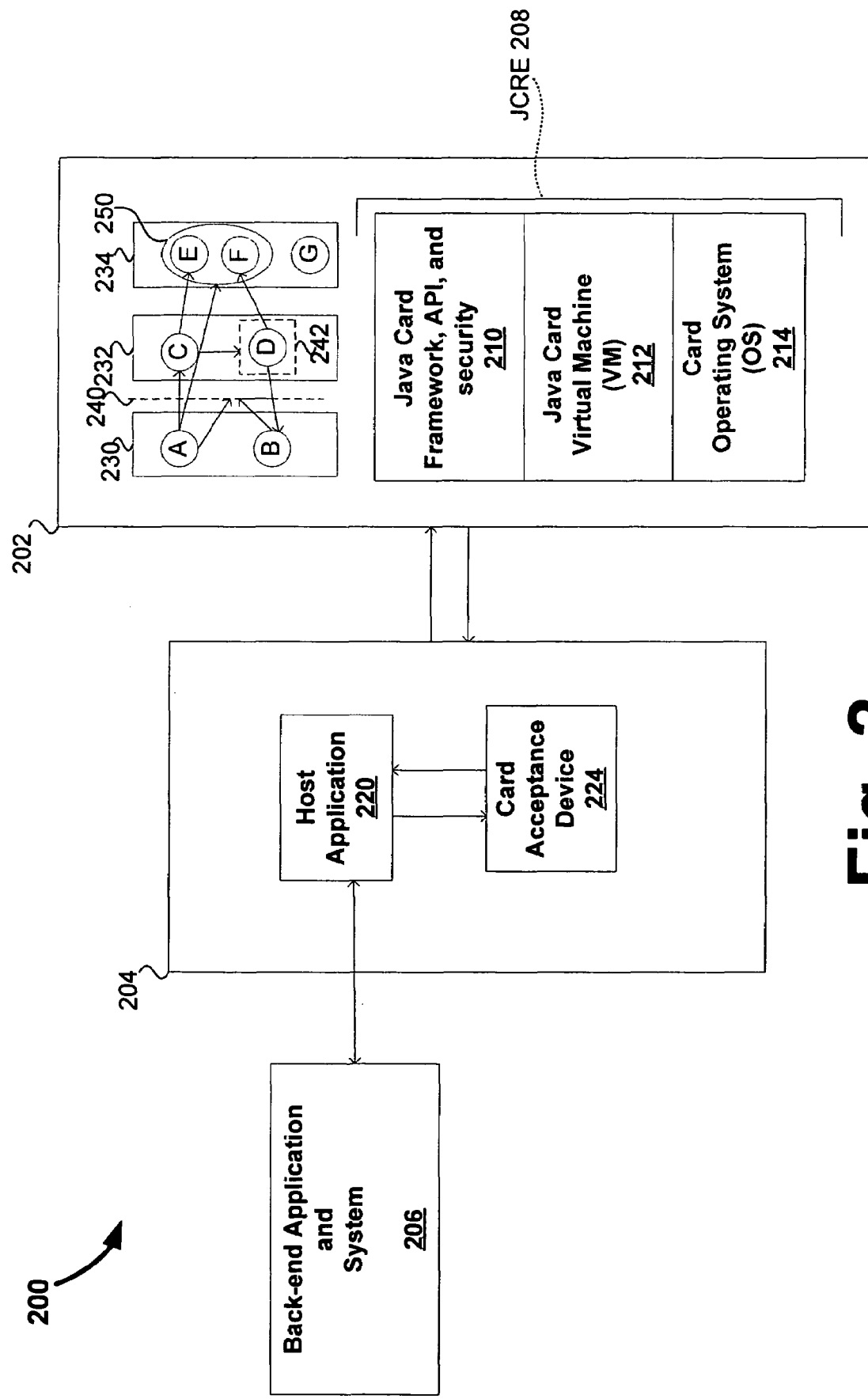
FIG. 2 illustrates an exemplarily computing environment in accordance with one embodiment of the invention.

FIG. 2 illustrates an exemplarily computing environment 200 in accordance with one embodiment of the invention. The computing environment 200 includes a card-side 202, a reader-side 204, and back-end application and system 206.

In the described embodiment, the card-side 202 is implemented as a Java Card™ platform 202 that provides a multiple-application environment. As FIG. 2 illustrates, a plurality of Java Card™ applications (or applets) A, B, C, D, E, F and G may reside on the Java Card™ platform 202 (or Java Card™). These Java Card™ applications (or applets) are supported by a Java Card Runtime Environment™ (JCRE) 208. The Java Card Runtime Environment™ (JCRE) 208 includes Java Card™ framework, Application Programming Interface (API), and security 210. The Java Runtime Environment™ (JCRE) 208 operates on a Java™ virtual machine 212 that is supported by a card Operating System (OS) 214. The Java Card™ applets A, B, C, D, E, F, G and H can be instantiated when loaded and stay alive when the power is switched off. As such, a card applet can behave in a similar way as a server and remain passive. In other words, after the card platform 202 is powered up, an applet can remain inactive until it's selected, at which time initialization may be done.

The reader-side 204 includes a host application 220 and a Card Acceptance Device (CAD) 224. The host application 220 can, for example, reside on a desktop or a terminal such as a PC, an electronic payment terminal, a cell phone, or a security subsystem. In any case, the host application 220 can facilitate communication between the back-end application and system 206 and the Java Card™ applets A, B, C, D, E, F and G. The Card Acceptance Device (CAD) 224 can, for example, be an interface device that sits between the host application 220 and the Java Card™ platform 202. In addition, the Card Acceptance Device (CAD) 224 can provide power to the card and/or facilitate electrical or (Radio Frequency) RF communication with the card side 202. The CAD 224 can, for example, be a card reader attached to a desktop computer using a serial port, or it may be integrated into a terminal such as an electronic payment terminal at a restaurant or a gas station. It should also be noted that the CAD 224 can, for example, forward Application Protocol Data Unit (APDU) commands from the host application 220 to the Java Card™ platform 202. The Application Protocol Data Unit (APDU) can also be used to forward responses from the Java Card™ platform 202 to the host application 220.

Accordingly, the reader side 204 allows a user of the Java Card™ platform 202 to access the services provided by the host application 220 and/or the back-end application and system 206. The back-end application and system 206 provides services that support the Java™ applets A, B, C, D, E, F, and G. For example, the back-end application 206 may provide connectivity to an electronic payment system. As such, the back-end application and system 206 can, for example, provide access to credit card and/or other payment information.

As will be appreciated, the Java Card Runtime Environment™ (JCRE 208) can provide a firewall protection for the Java™ applets A, B, C, D, E, F and G. Moreover, the firewall protection provided by the Runtime Environment (JCRE 208) is configurable. This means that, among other things, the firewall protection does not have to be defined based on package boundaries that contain one or more Java™ applet. In other words, firewall protection does not have to be defined based on the packages 230, 232, and 324. The firewall protection can be configured using a firewall control block that is further illustrated (see for example FIG. 3), but first the configurable firewall will be further illustrated with respect to firewall boundaries that can be configured for various Java™ applets.

As illustrated in FIG. 2, package 230 contains Java™ applets A and B. Similarly, package 232 contains Java™ applets C and D. Package 234 contains Java™ applets E, F and G. The firewall boundaries, however, can be defined for each Java™ applet independently. In other words, for each one of the Java™ applets A, B, C, D, E, F and G a fire wall boundary can be defined that is not dependent on the package that contains the Java™ applet. By way of example, Java™ applet A of package 230 can be granted access through a firewall boundary portion 240 to the Java™ applet C in the package 232. The firewall portion 240, however, may deny access to the Java™ applet B of package 230 when it tries to access Java™ applet C in the package 232.

To further illustrate, FIG. 2 also depicts a firewall boundary portion 242 around the Java™ applet D. The firewall boundary portion 242 can, for example, deny access to all other Java™ applets including Java™ applet C that is contained within the same package 232. It should be noted that Java™ applet D, however, may be able to access other applets (e.g., Java™ applet B). It should also be noted that the firewall can be used to implement a library that can be accessed by one or more selected Java™ applets and/or packages regardless of package boundaries. By way of example, Java™ applets E and F can be implemented as a library 250. The library 250 can be accessed by any of the Java™ applets A, B, C, and D.

As noted above, firewall boundaries can be implemented using a firewall control block. This firewall control block that can be defined for each Java™ applet and/or Java™ package in accordance with one aspect of the invention. The firewall control can be used to determine whether a Java™ applet should be granted access to another Java™ applet and/or Java™ package.

FIG. 3 illustrates a firewall control block 300 in accordance with one embodiment of the invention. Firewall control block 300 includes a firewall control value 302 and a firewall control indicator 304. The firewall control 302 value provides access privileges definition. The firewall control indicator 304 indicates how the definitions should be interpreted to determine whether one component should access another component.

Figure 3A:
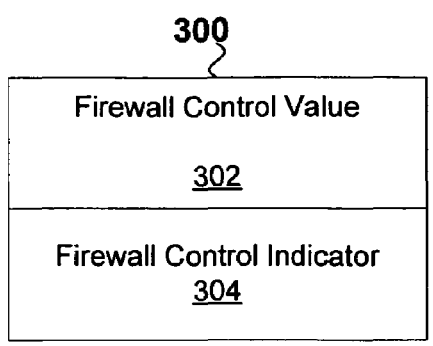
Figure 3B:
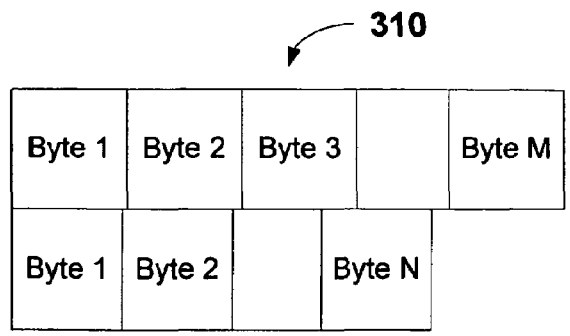

The firewall control value 302 can, for example, be used to define a firewall access value for a Java™ applet. In other words, the control value 302 can define the access privileges for a first Java™ applet and/or package. The firewall control indicator 304 can then be used to determine whether other Java™ applets can access the first Java™ applet and/or Java™ package. As will be appreciated, the firewall control value 302 and control indicator 304 can, for example, each be implemented as an array of bytes (i.e., an array of one or more bytes). FIG. 3B illustrates a firewall control block 310 implementation. The firewall control block 310 includes a firewall control value represented as an array of M bytes. An array of N bytes represents the firewall control indicator. It should be noted that N is typically less than M (i.e., typically less bytes are need for the firewall control indicator.

Figure 4:
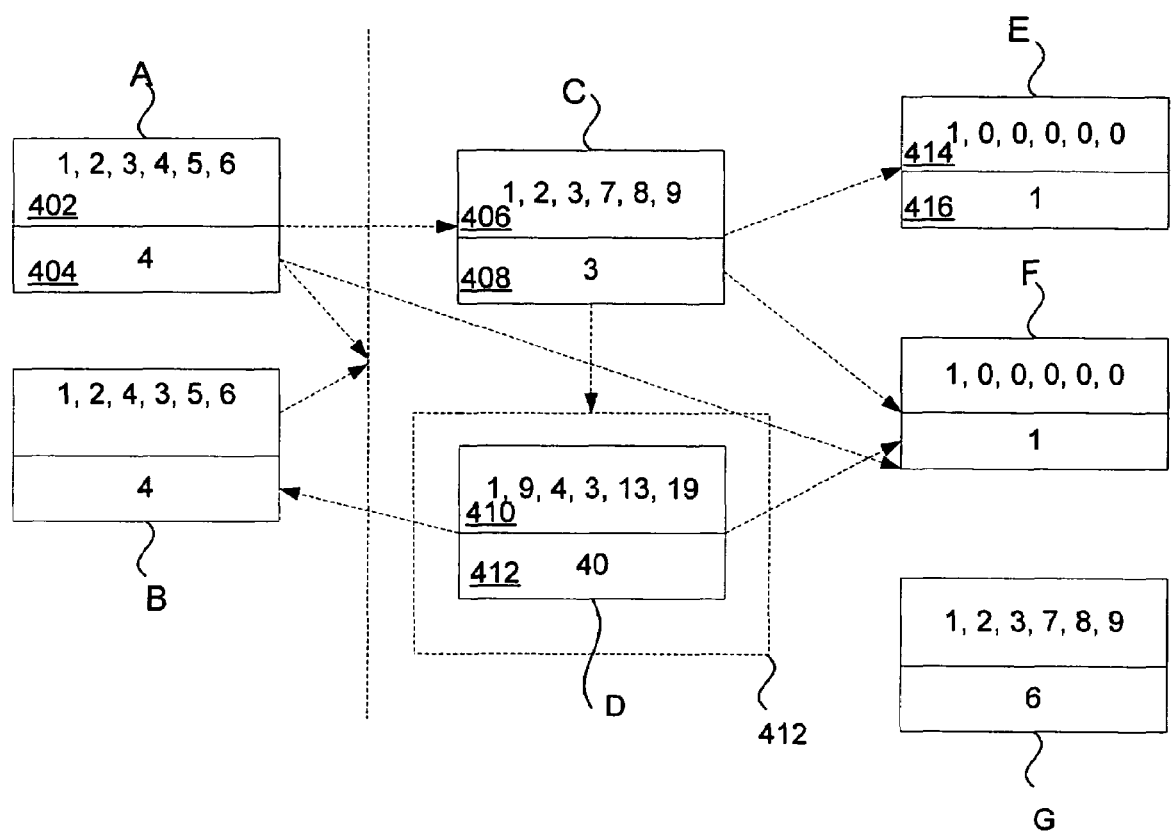
FIG. 4 illustrates simplified firewall control blocks that can be implemented for Java™ applets.

To further illustrate, FIG. 4 illustrates simplified firewall control blocks A, B, C, D, E, F and G that can respectively be implemented for applets A, B, C, D, E, F and G of FIG. 2. As such, firewall control block A can, for example, be used to determine which Java™ applet can be accessed by Java™ applet A. In addition, the firewall control block A can be used to determine whether another applet can access the Java™ applet A. As illustrated in FIG. 4, the firewall control blocks A includes a firewall control value 402 and a firewall control indicator 404. The firewall control value 402 is represented as a series of numerical values (e.g., byte values {1, 2, 3, 4, 5, 6}).

The firewall control value 402 ({1, 2, 3, 4, 5, 6}) can be used to determine whether Java™ applet A can access, for example, Java™ applet C. In order to make this determination, the firewall control indicator 408 of firewall control block C can be used. The firewall control indicator 408 indicates a {3} value. This indicator value can, for example, be interpreted as allowing access to Java™ applets (or packages) that match the first three values of the firewall control value 406 ({1, 2, 3, 7, 8, 9}) of firewall control block C.

This means that the first three values of the firewall control value 402 ({1, 2, 3, 4, 5, 6}) can be compared with the first three values of firewall control value 406 ({1, 2, 3, 7, 8, 9}). It should be noted that the first three values of the firewall control value 402 ({1, 2, 3, 4, 5, 6}) match the first three values of the firewall control value 406 ({1, 2, 3, 7, 8, 9}). Accordingly, applet A can be granted access to applet C.

On the other hand, applet C cannot access applet A because the firewall control indicator 404 ({4}) indicates that the first four values of the firewall control value 406 ({1, 2, 3, 7, 8, 9}) should match the firewall control value 402 ({1, 2, 3, 4, 5, 6}). The fourth value, however, does not match (i.e., 7 is not equal to 4). Accordingly, applet C is denied access to applet A.

Similarly, Java™ applet B is not granted access to Java™ applet C because the second value (or third value) of the firewall control value 410 ({1, 9, 4, 3, 5, 6}) does not match the second value (or third value) of the firewall control value 406 ({1, 2, 3, 7, 8, 9}). The firewall control indicator 412 of the firewall control block D indicates a {40} value. The {40} value can, for example, indicate that no other Java™ applet can access Java™ applet D (e.g., only Java Card™ management system can access Java™ applet D). The Java™ applet D, however, may be able to access other Java™ applets (e.g., Java™ applet B). On the other hand, firewall control indicators 414 and 416 which are respectively provided for Java™ applets E and F can indicate a {1} value that can, for example, be interpreted as allowing access to all Java™ applets which have their first firewall control value equal to the value {1} (e.g., applets A, B, C, and G). As such, the applets E and F can, for example, represent a library that can be provided to other selected applets.

Figure 3C:
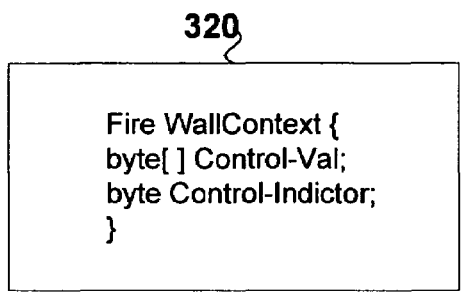

FIG. 3C illustrates a control block 320 in accordance with another embodiment of the invention. As illustrated in FIG. 3C the firewall control value 300 can be implemented as an array of bytes while a single byte is used to implement the firewall control value 302.

Figure 3D:
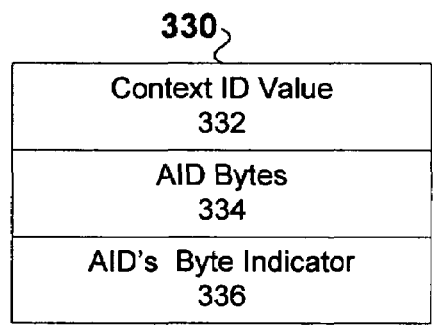

It should also be noted that in accordance with other embodiments of the invention, a firewall control block can be implemented using an additional single byte. This single byte can be added to the data that is typically already available. To illustrate, FIG. 3D depicts a firewall context implementation 330 in accordance with another embodiment of the invention. The firewall context implementation 330 includes the context Identification (ID) 332 and Application Identifier Data (AID), which are typically provided in Java Card™ environments. In addition to these, an AID's byte indicator 336 is provided. The AID's byte indicator 336 can be used in a similar manner as the firewall control indicator (e.g., 404, 408 shown in FIG. 4) while the Application Identifier Data (AID) can be used as the firewall control value (e.g., 402, 406 of FIG. 4).

As will be appreciated, similar to existing Java Card™ environments, the Application Identifier Data (AID) can be defined based on the ISO 7816 standard. ISO 7816 is a multipart standard that describes a broad range of technology for building smart card systems. ISO 7816-5 defines the AID (application identifier) data format to be used for unique identification of card applications (and certain kinds of files in card file systems). The Java Card™ platform uses the AID data format to identify applets and packages. AIDs are administered by the International Standards Organization (ISO), so they can be used as unique identifiers.

Figure 3F:
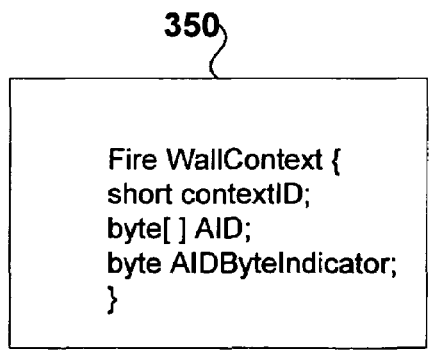
Figure 3E:

As illustrated in FIG. 3E, the AID format used by the Java Card™ platform can be an array of bytes that is interpreted as two distinct pieces. The first piece is a 5-byte value known as RID (Resource Identifier). The second piece is a variable length value known as a PIX (Proprietary Identifier Extension). A PIX can be from 0 to 11 bytes in length. Thus an AID can be from 5 to 16 bytes in total length. ISO controls the assignment of RIDs to companies, with each company obtaining its own unique RID from the ISO. Companies manage assignment of PIXs for AIDs using their own RIDs. In the Java™ platform, packages are uniquely identified using unicode strings and a naming scheme based on Internet domain names. In the Java Card™ platform, packages and applets can be identified using AIDs. As such, each applet installed on a Java Card™ technology enabled device has a unique AID. This AID is constructed similarly to a package AID. It is typically a concatenation of the applet provider's RID and PIX for that applet.

FIG. 3F illustrates an implementation of the firewall control block 350 in accordance with yet another embodiment of the invention. The firewall control block 350 can, for example, represent an implementation of control block 330 of FIG. 3D. In any case, similar to existing Java Card™ environments, a byte array is used to represent the AID and a short value is used to represent a context ID typically used to represent the context (or object space). As will be appreciated, an AID byte indicator is implemented as a single byte value. As such, control block 350 may be suited for situations where there is no need to minimize the overhead for the firewall implementation. Nevertheless, the AID Byte indicator can be used as a firewall control indicator and the AID can be used as the firewall control value in a similar manner as described above.

Figure 3G:
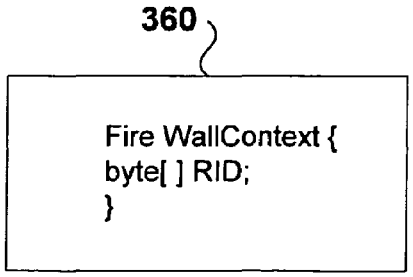

FIG. 3G illustrates a control block 360 in accordance with yet another embodiment of the invention. In the described embodiment, the control block 360 is implemented using a single byte array that represents the RID value. This means that only the RID value is used to determine whether a Java™ applet (or package) can access another Java™ applet (or package). By way of example, if the RID values match then access could be granted. RID values are typically provided in Java Card™ environments. Accordingly, control block 360 can also be implemented without requiring a significant amount of overhead for storing and processing firewall control block information. Similar to the RID value, the AID value can be used to implement a firewall control block.

It should also be noted a plurality of control values and indicators can be used to implement a firewall control block. To further, illustrate, FIG. 3I depicts a firewall control block 370 in accordance with yet another embodiment of the invention. The firewall control block 370 includes firewall control value 372 and firewall control value 374 which can be used, for example, to define access privileges of a first component with respect to other components. In that case, the firewall control value 376 and firewall control value 378, however, can be used to define access privileges other components with respect to the first component.

Based on the foregoing, it should be clear that the invention contemplates many different firewall control block embodiments. One or more of these embodiments may be suited for a particular system requirement (e.g., memory storage, speed, etc.) For example, control block 360 of FIG. 3G may be suited to environments where memory and overhead designated to the firewall should be minimized.

Figure 3H:
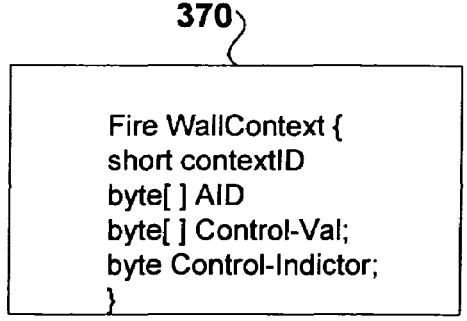

It should also be noted that various embodiments may be combined. By way of example, FIG. 3H illustrates a control block 370 in accordance with still another embodiment of the invention. The control block 370 can, for example, represent a combination of control blocks 320 and 350. In the described embodiment, AID, firewall control value, and firewall control indicator are provided. As will be illustrated below, the control block 370 provides the flexibility to use various techniques for implementing configurable firewalls in Java Card™ environments. In addition, control block 370 may serve as a useful tool to illustrate some of these techniques.

Accordingly, FIG. 5 illustrates a method 500 for providing a firewall in Java Card™ environment in accordance with one embodiment of the invention. The method 500 can, for example, be used in conjunction with the control block 370 of FIG. 3H where AID, firewall control value, and firewall control indicator are all provided. Initially, at operation 502, the first bytecode instruction of a first Java™ applet is read. Next, at operation 504, a determination is made as to whether the bytecode of the first Java™ applet is attempting to access an object in another (or a second) Java™ applet. If it is determined at operation 504 that the bytecode of the first Java™ applet is not attempting to access an object in a second Java™ applet, the method 500 proceeds to operation 506 where it is determined whether the last bytecode instruction has been reached. If that is the case, the method 500 ends. However, if it is determined at operation 506 that the last bytecode instruction has not been reached, the method 500 proceeds to operation 508 where the next bytecode instruction of the first Java™ applet is read. Thereafter, the method 500 proceeds to operation 504 where it is determined whether the bytecode of the first Java™ applet is attempting to access an object in a second Java™ applet.

If it is determined at operation 504 that the bytecode of the first Java™ applet is attempting to access an object in a second Java™ applet, the method 500 proceeds to operation 510 where the firewall control indicator of the second Java™ applet is read. Accordingly, at operation 512, a determination is made as to whether the firewall control indicator of the second Java™ applet is equal to a first value (e.g., 0x80). If it is determined at operation 512 that the firewall control indicator of the second Java™ applet is equal to the first value, the method 500 proceeds to operation 514 where the control block firewall protection can be bypassed (e.g., firewall protection can be provided based on package boundaries). The method 500 ends following operation 514. However, if it is determined at operation 512 that the firewall control indicator of the second Java™ applet is not equal to a first value, the method 500 proceeds to operation 516, where it is determined whether the firewall control indicator of the second Java™ applet is equal to a second value. The second value can indicate that PIX values (see, for example, FIG. 3E) of the first and second Java™ applets should be compared for a match. Accordingly, if the firewall control indicator of the second Java™ applet is equal to the second value, at operation 518, the PIX values of the first and second applets can be compared. Thereafter, the method 500 proceeds to operation 520 where it is determined whether these values match. If these values don't match, the method 500 proceeds to operation 522 where access is denied. In addition, an error can be output at operation 524 (e.g., a "Java.lang.SecurityException" can be thrown). The method 500 ends following operation 524.

On the other hand, if it is determined at operation 520 that there is a match, the method 500 proceeds to operation 526 where the first Java™ applet is granted access to the second Java™ applet. As will be appreciated, this access can be provided without requiring a sharable interface to be implemented. In one embodiment, a reference to the second applet is provided by a method that can be invoked. This method, can for example, be a relatively simple get-reference method implemented as a part of the Java Card™ management (or system) environment (e.g., getAppletReference( ) method). As will be appreciated by those skilled in the art, a partner method can also be provided for this get-reference method. This partner method can, for example, be a method implemented as a Java™ applet class.

Referring back to FIG. 5, if it is determined at operation 516 that the firewall control indicator of the second Java™ applet is not equal to the second value, the method 500 proceeds to operation 528 where it is determined whether the firewall control indicator of the second Java™ applet is equal to the third value. If that's the case, the method 500 proceeds to operation 530 where the AID (see, for example, FIG. 3D) values of the first and second applets are compared. Thereafter, the method 500 proceeds to operation 520 in a similar manner as described above.

However, if it determined at operation 528 that the firewall control indicator of the second Java™ applet is not equal to the third value, the method 500 proceeds to operation 532 where it is determined whether it is equal to a fourth value. The fourth value can indicate that access is reserved only for the Java Card™ management. Accordingly, if the firewall control indicator of the second Java™ applet is equal to the fourth value, the method 500 proceeds to operation 534 where it is determined whether the bytecode is being executed under the Java Card™ management context (e.g., whether the context ID is that of the Java Card™ management). Depending on this determination, the method 500 can proceed either to operation 522 where access is denied or operation 526 where access is granted, in a similar manner as described above.

Finally, if it determined at operation 532 that the firewall control indicator of the second Java™ applet is not equal to the fourth value, the method 500 proceeds to operation 536 where the firewall control indicator is interpreted. By way of example, the firewall control indicator can be interpreted in a similar manner as illustrated in FIG. 4, where one or more bytes of the firewall control values respectively assigned to the first and second applets are compared based on the value of the firewall control indicator. In any case, based on the interpretation, at operation 538, the appropriate control values can be determined and compared for a match. Accordingly, the method 500 proceeds to operation 520 where it is determined whether there is match between the values. The method 500 proceeds in a similar manner as described above where access can be granted at operation 526 or denied at operation 522. The method 500 ends following either operation 524 where an error is output or the first Java™ applet is allowed accessed to the second Java™ applet at operation 526.

FIG. 6A illustrates a firewall control block 602 in accordance with one embodiment of the invention. The firewall control block 602 includes an associated security identification 604 and access operations 606. The associated security identification 604 identifies one or more identifiers that have been associated with a component (e.g., Java™ applet, Java™ package) for various security purposes. In other words, each of these identifiers can be assigned to a component of the computing system as a security identifier. The access operations 606 represent one or more operations that have been respectively assigned to the identifiers.

To further illustrate, FIG. 6B depicts a firewall control block 610 in accordance to another embodiment of the invention. As shown in FIG. 6B, the associated security Identification 604 of FIG. 6A is represented as a series of identifiers ID1, ID2, ID3 and ID4. Each of the identifiers ID1, ID2, ID3 and ID4 has been associated with one or more operations. Namely, ID1 has been associated with a read operation, ID2 has been associated with read, write, and create operations, ID3 has been associated with create and execute operations, and ID4 has been associated with read and update operations.

The access operations define access privilege for each of the identifiers ID1, ID2, ID3 and ID4. For example, the associate security Identifier ID2 has read, write and delete privileges. On the other hand, the associate security Identifier ID1 has only read privilege, and so forth. In any case, it should be noted that the firewall control block 610 can be used to identify an associated component (e.g., Java™ applet, Java™ package). This means that the firewall control block 610 can be assigned to a first component in a computing environment. Moreover, the firewall control block 610 can be used to identify other components as associated components with defined access privileges with respect to operations they can perform.

Figure 6F:
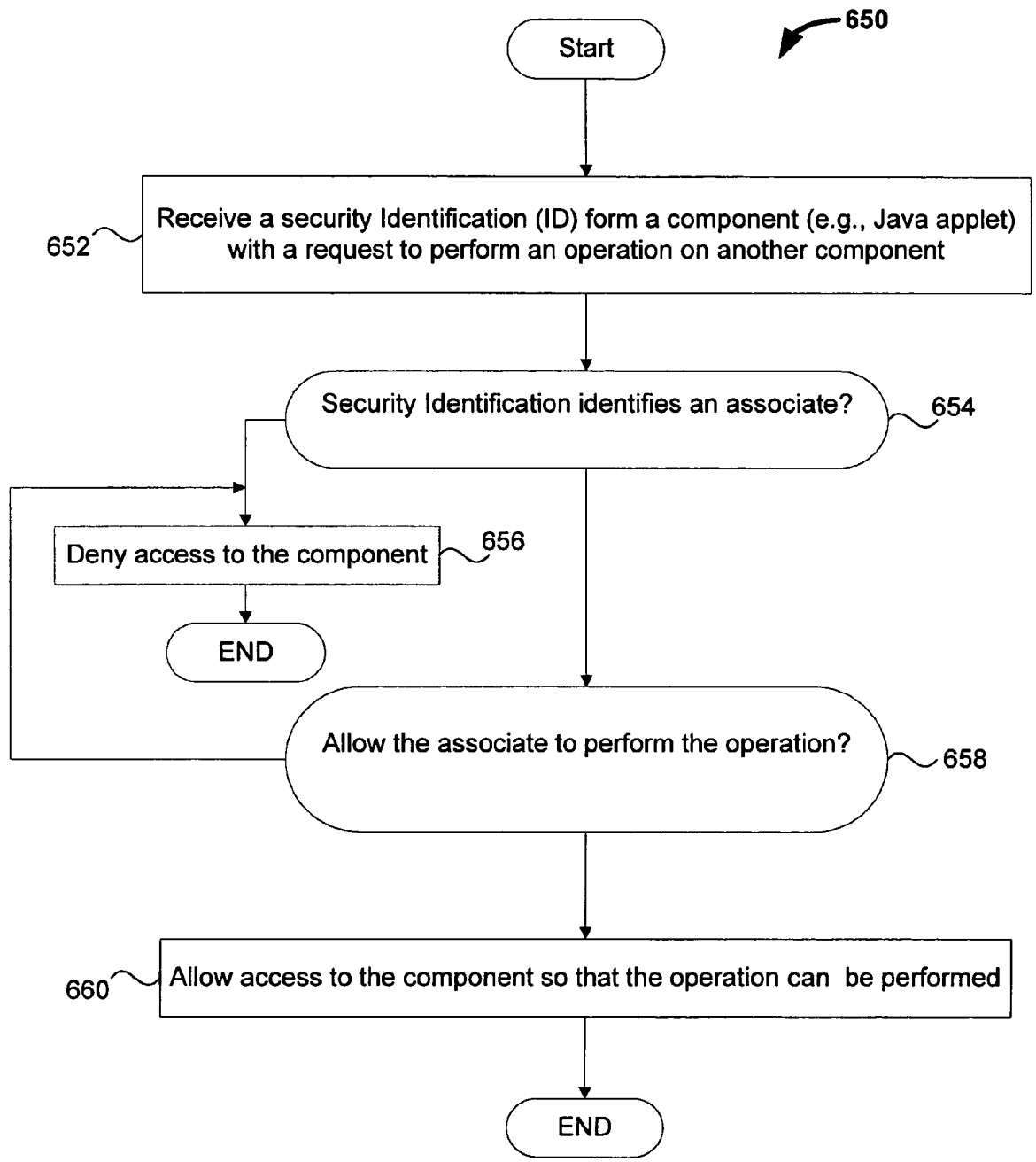
FIG. 6F illustrates a security method in accordance with one embodiment of the invention.

To further elaborate, FIG. 6F illustrates a security method 650 in accordance with one embodiment of the invention. Initially, at operation 652, a security identification (ID) with a request to perform an operation on a component (e.g., Java™ applet or package) is received. Typically, the request is made by another component. Next, at operation 654, a determination is made as to whether the security identification (ID) identifies an associate of the component (e.g., an associated ID). In other words, it is determined whether the security identification (ID) identifies as associate of the component. This determination can, for example, be made based on the associate security identification 610 of FIG. 6B. By way of example, it can be determined whether the security identification (ID) matches any one of the ID1, ID2, ID3 and ID4 (shown in FIG. 6B).

In any case, if it is determined at operation 654 that the security identification (ID) does not identify an associate of the component, the security method 650 proceeds to operation 655 where access is denied. The security method 650 ends following operation 656. However, if it is determined at operation 654 that the security identification (ID) identifies an associate of the component, the security method 650 proceeds to operation 658 where it is determined whether the associate should be allowed to perform the operation. This determination can, for example, be performed based on the access operations defined for the associate. By way of example, as illustrated, in FIG. 6B, ID1 has been granted read privileges. Thus, a write operation should be denied for associate identified by ID1.

Accordingly, if it is determined at operation 658 that the associate should not be allowed to perform the operation, access to the component is denied. This means that the operation will not be performed on the component. The method 650 ends following operation 658. On the other hand, if it is determined at operation 658 that the associate should be allowed to perform the operation, the security method 650 proceeds to operation 660 when the component is allowed access to perform the operation. Method 650 ends following operation 660.

Referring now to FIG. 6C, an implementation of a firewall control block 610 is depicted in accordance with one embodiment of the invention. As shown in FIG. 6C, the associate security Identifiers can be implemented as an array of associated ID's, wherein each associated ID includes an ID and an access mask that defines the operations for that ID.

As noted above, various embodiments of firewall control blocks can be combined with each other. To further illustrate, FIG. 6D illustrates a firewall control block 630 in accordance with yet another embodiment of the invention. The firewall control block 630 can, for example, represent combinations of firewall control block 602 of FIG. 6A and firewall control block 300 of FIG. 3A. Similar to other disclosed embodiments, the firewall control block 630 includes a context ID value 632. However, it should be noted that firewall control block 630 includes a control valve enabler 634 and an associated ID enabler 636. When the control valve enabler 634 is set (e.g., on), a firewall control valve 638 and a firewall control indicator 640 are used to determine whether access should be allowed. This means that the firewall control valve and indicator (638 and 640) can be used, for example, in a similar manner as discussed above. (See, for example, FIG. 4.)

Similar to the control valve enabler 634, the associated ID enabler 636 can act as switch. Hence, when the associated ID enabler 636 is set, the associated Identification 642 and operations 644 are used to implement security based on associated Identification 642 and access operations 644. This can, for example, be achieved in a similar manner as discussed above. (See, for example, FIG. 6B.)

It should be noted that the firewall control block 630 also includes an authenticated ID 646. The authenticated ID 646 can be used to determine whether an associate ID has been authenticated. FIG. 6E illustrates an implementation of firewall control block 630 in accordance with one embodiment of the invention. In the described embodiment, each of the authenticated ID 646, control valve enable 634, and associate ID enabler 636 has been implemented as a Boolean value.

Authentication can be performed using a security context block that is provided in accordance with other aspects of the invention. Similar to a firewall control block, a security context block can be provided for various component of the computing system (e.g., Java™ applets, Java™ packages). As will be illustrated, in addition to authentication, the security context block can be used for a variety other security related operations. These operations can, for example, include digital signatures, verification, encryption and decryption. In other words, a comprehensive security environment can be implemented using the security context block.

Figures 7A, 7B:

To further illustrate, FIG. 7A depicts a security context block 700 in accordance with one embodiment of the invention. The security context block 700 includes a security context identification 702 and a cryptographic system 704. As will be appreciated, the security identification 702 can be provided and assigned to various components (e.g., Java™ applets, Java™ packages) of the computing system. In accordance with the embodiment of the invention, the security context ID 702 can be used to provide (e.g., generate) an associate security identification. As will be appreciated, this associate security identification can be used in a firewall control block (e.g., associate security identification 602 of FIG. 6A used in a firewall control block 602 of FIG. 6A.

As shown in FIG. 7A, the security context block 700 also includes a cryptographic system 704. It will be appreciated by those skilled in the art that the security context block 700 can support various cryptographic operations. To further illustrate, FIG. 7B depicts a security context block 710 including a cryptographic system 712 in accordance with another embodiment of the invention. The cryptographic system 712 includes a plurality of cryptographic keys (key 1, key2, key3, key4 and key5). As illustrated in FIG. 7B, for each of the key 1, key2, key3, key4 and key5, key management information and cryptographic algorithm(s) is also provided. The key management information can be any information that is used to provide, maintain, and/or use the cryptographic keys. As such, the key management information can, for example, include information relating to type and/or size of the cryptographic keys. Similarly, each of the algorithm components (algorithm 1, 2, 3, 4 and 5) can identify the cryptographic algorithm(s) that can be used with a key. In addition, as illustrated in FIG. 7B, for each of the cryptographic keys (key 1, key2, key3, key4 and key5) a series of operations can be defined. By way of example, cryptographic key1 can be provided and used for digital signatures, cryptographic key2 can be provided and used for verification, cryptographic key3 can be provided and used for encryption, and so forth. FIG. 7C illustrates a security context in accordance with another embodiment of the invention.

Figure 8:
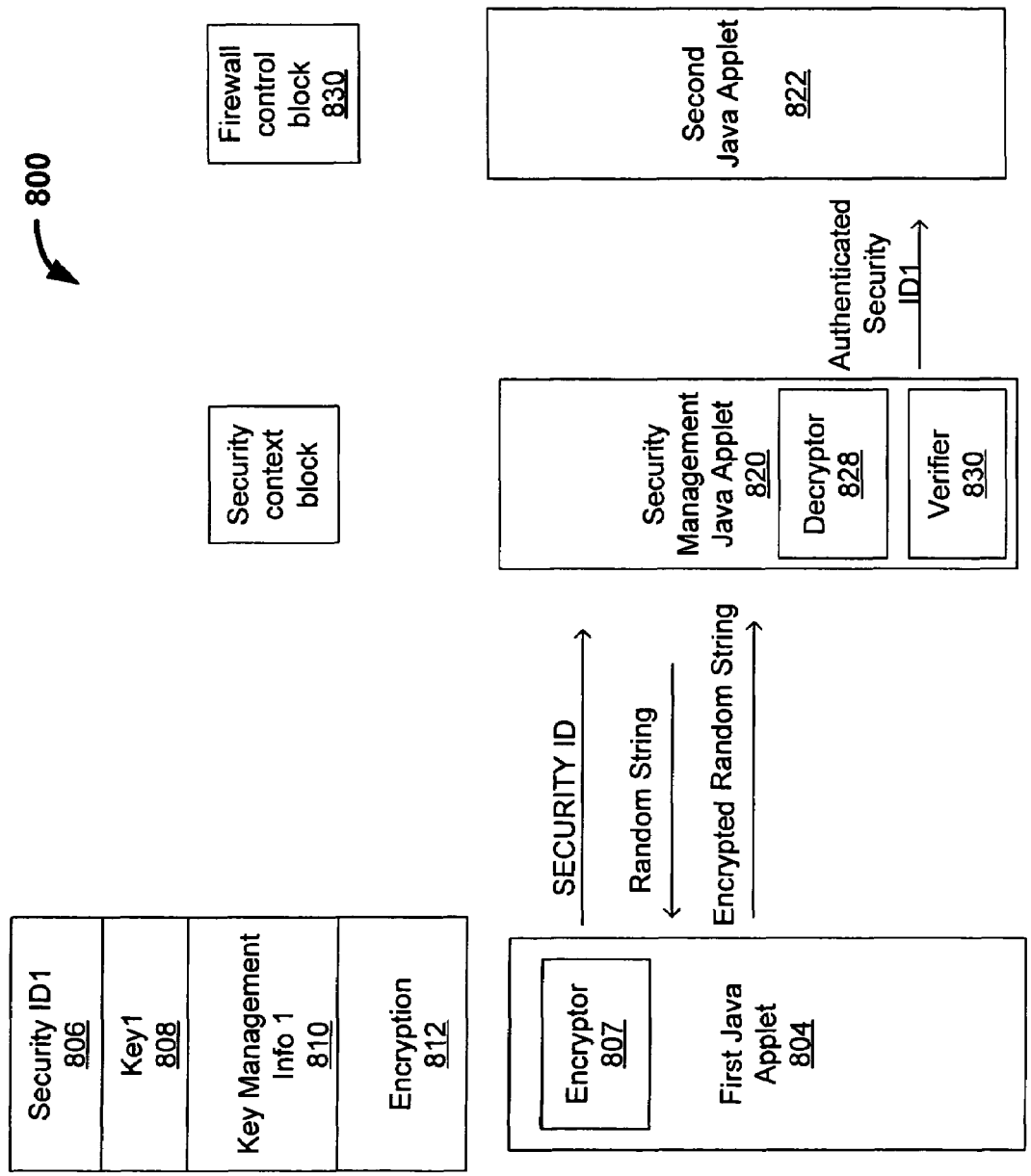
FIG. 8 depicts a Java™ compliant computing environment in accordance with one embodiment of the invention.

As noted above, a security context block (e.g., security context block 700) can be provided and assigned for various components of a computing environment (e.g., Java™ applet, Java™ package). The security context block can be used to implement a secure environment where various security measures can be implemented. These security measures, for example, include cryptographic operations (e.g., digital signatures, verification, encryption, decryption, authentication, etc.) that are provided using cryptographic systems. To further illustrate, FIG. 8 depicts a Java™ computing environment in accordance with one embodiment of the invention. As illustrated in FIG. 8, a security context block 802 is provided for a first Java™ applet 804. The security context block 802 includes a security ID 806 (ID1), a key 808, and key management information 810. As noted by a component 812 of the security context block 802, key 808 and key management information 810 are used for encryption in this example.

The Java™ computing environment 800 also includes a security management Java™ applet 820 and a second Java™ applet 822. In this example, the first Java™ applet 804 is attempting to access the second Java™ applet 822. However, before access is granted, the first Java™ applet 804 is required to have its security ID 806 (ID1) authenticated by the security management Java™ applet 820. In other words, the security management Java™ applet 806 can verify that the first Java™ applet 804 is the entity that it claims to be (e.g., the rightful owner of the ID1).

As illustrated in FIG. 8, initially, the first Java™ applet 804 presents its security identification 806 (ID1) to the security management Java™ applet 820. In response, the security management Java™ applet 820 sends a random string to the first Java™ applet 804. The first Java™ applet 804, in turn, uses key 808 (key1) and key management 810 (info 1) to encrypt the random string. This can, for example, be achieved by an encryptor 807. In any case, after encryption, the encrypted random string is then transmitted to the security management Java™ applet 820. The encrypted random string is decrypted by a decryptor 828 and verified by a verifier 830. As will be appreciated, a variety of cryptographic techniques can be used for the verification process. By way of example, a set of public and private keys can be assigned and used by the first Java™ applet 804 and the security management Java™ applet 820. It should also be noted that the security management Java™ applet 820 can use the security context block 802 and/or another security context block (not shown) to perform the decryption and verification process.

In any case, if the random string is verified, the authentication process if successful (i.e., it can be assumed that the rightful owner of the security ID1 is using the security ID 806). Accordingly, if the authentication process is successful, the security management Java™ applet 820 forwards the authenticated security ID (ID1) to the second Java™ applet 822. As will be appreciated, the second Java™ applet 822 can, for example, use the authenticated security ID1 as an associate identification in a similar manner as discussed above. This means that a firewall control block 830 can be provided for the second Java™ applet. The firewall control block 830 can, for example, be the firewall control block 630 of FIG. 6D. As such, the second Java™ applet 820 can use the authenticated security ID1 as the associate identification 642 (shown in FIG. 6D) to determine whether an associate is attempting to access it and what operation should be allowed.

It should be noted that the authentication process described above may alternatively be performed by the second Java™ applet 822. In other words, in alternative embodiments, the first Java™ applet 804 may directly present the security ID 806 (ID1) to the second Java™ applet 820 for the authentication process. In any case, as illustrated above, the invention can be used to implement a relatively light-weight authentication mechanism. It will also be appreciated by those skilled in the art that various components (e.g., Java™ applets) can directly interact with each other to achieve this authentication process. In other words, the authentication process illustrated above can be automated without requiring further human intervention and/or implementation and maintenance of configuration files. In one embodiment, Internal Virtual Machine (VM) objects (or structures) are used to implement the security context environment that enables this authentication process. It should also be noted that the authentication process illustrated above and other cryptographic operations can be also used, by entities that are not necessarily resident on the Java™ Run time environment (e.g., Java Card™, virtual machine). These entities, for example, can be external applications that access Java™ applets that are downloaded on a Java Card™ As such, for example, a host application (e.g., host application 220 shown on FIG. 2) can also be authenticated before accessing any resources (e.g., applets on a Java Card™)

Figure 9:
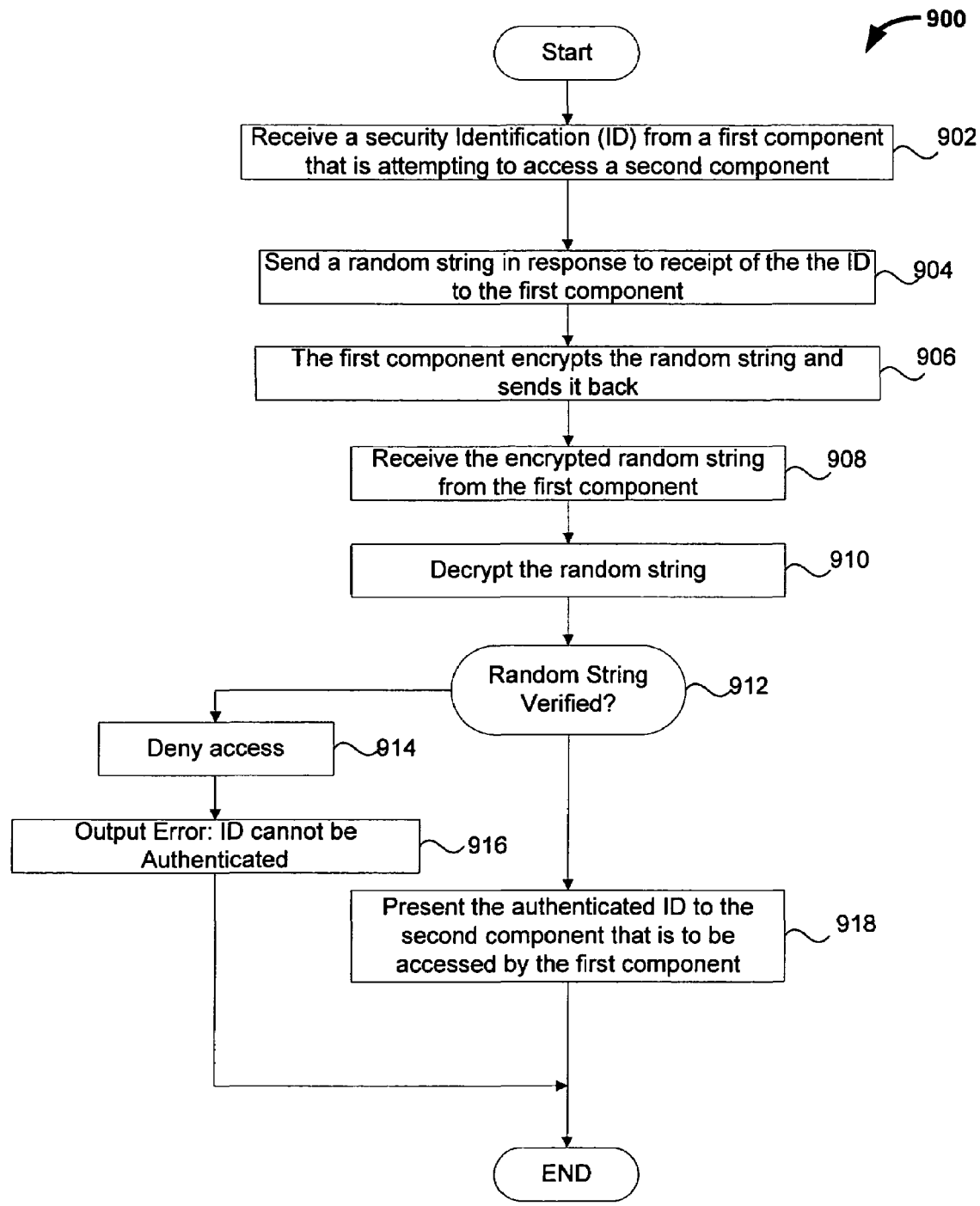
FIG. 9 illustrates a method for authenticating a security Identification (ID) in accordance with one embodiment of the invention.

FIG. 9 illustrates a method 900 for authenticating a security Identification (ID) in accordance with one embodiment of the invention. Method 900 can, for example, be used by the security Java™ management applet 820 of FIG. 8. Initially, at operation 902, a security Identification (ID) is received from a first component (e.g., first Java™ applet 804 of FIG. 8). The first component is attempting to access a second (e.g., second Java™ applet 822 of FIG. 8). Typically, this request is to perform an operation on the second component (e.g., read, write).

In any case, in response to the receipt of the security Identification (ID), at operation 904, a random string is sent to the first component. Next, at operation 906, the first component encrypts the random string and sends it. Again, it should be noted that encryption/decryption can, for example, be achieved using private and/or public keys that are provided by a security context block in accordance with one embodiment of the invention. Accordingly, at operation 908, the encrypted random string is received from the first component. Thereafter, the method 900 proceeds to operation 910 where the encrypted random string is decrypted, for example, by using the private and/or public keys that are provided by a security context block. Next, at operation 912, a determination is made as to whether the random string can be verified. If it is determined at operation 912 that the random string cannot be verified, the method 900 proceeds to operation 914 where the first component is denied access. Accordingly, at operation 916, a error can be output (e.g., ID cannot be authenticated). The method 900 ends following operation 916.

However, if it is determined at operation 912 that the random string can be verified, the method 900 proceeds to operation 914 where the authenticated ID is presented to the second component. It should be noted that the second component can use a firewall control block to process the authenticated ID to determine whether access should be granted. This can, for example, be achieved using method 650 of FIG. 6F where it is determined whether the ID identifies an associate (operation 654) and whether the requested operation should be allowed for the associate (operation 658). The method 900 ends following operation 914.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed:

1. A computing environment, comprising:
    a virtual machine;
    a first application operating on said virtual machine;
    a security context block that determines whether a first security identification can be authenticated; and
    a first firewall control block, wherein said first firewall control block includes:
        an associate security identification portion that identifies one or more associates of said first application as identified associates, and wherein each one of said one or more identified associates has access privilege with respect to said first application; and
        an access-operations portion that for each one of said one or more identified associates identifies one or more operations that have been allowed to be performed,
    wherein the security context block presents the first security identification to the first firewall control block responsive to determining that said first security identification can be authenticated.

2. A computing environment as recited in claim 1, wherein said associate security identification comprises:
    one or more identifiers that have been assigned to said one or more identified associates; and
    wherein for each one of said one identifiers, one or more operations have been defined in said access-operations portion.

3. A computing environment as recited in claim 2, wherein said one or more operations include read, write, delete, create, and update operations.

4. A computing environment as recited in claim 1,
    wherein said computing environment includes a second application operating on said virtual machine,
    wherein said first firewall control block includes a security ID of said second application, thereby indicating that said second application is an identified associate of said first application, and
    wherein said first firewall control block also includes one or more operations that have been defined for said second application, thereby indicating what operations can be performed by said second application on said first application.

5. A computing environment as recited in claim 4,
    wherein said computing environment is a Java compliant computing environment, and
    wherein said first and second applications are Java compliant applets.

6. A computing environment as recited in claim 4,
    wherein said computing environment is a Java Card compliant computing environment, and
    wherein said first firewall control block is implemented in the run time environment.

7. A mobile computing device, comprising:
    a Java compliant virtual machine;
    a first Java compliant applet operating on said Java compliant virtual machine;
    a security context block that determines whether a first security identification can be authenticated; and
    a first firewall control block, wherein said first firewall control block includes:
        an associate security identification portion that identifies one or more associates of said first application as identified associates, wherein each one of said one or more identified associates has access privilege with respect to said first application, and
        an access-operations portion that for each one of said one or more identified associates identifies one or more operations that have been allowed to be performed,
    wherein the security context block presents the first security identification to the first firewall control block responsive to determining that said first security identification can be authenticated.

8. A mobile computing device as recited in claim 7, wherein said mobile device is a Java compliant smart card.

9. A mobile computing device as recited in claim 8, wherein a firewall control block is defined for every Java compliant applet that operates on said Java compliant virtual machine.

10. A method of providing security for a Java compliant computing environment that includes a Java virtual machine and a plurality of Java compliant applets that operate on said Java virtual machine, said method comprising:
    receiving a request from a first Java compliant applet operating on Java virtual machine to perform an operation on a second Java compliant applet, said request including a security identifier that identifies said first Java compliant applet;
    a security context block determining whether a first security identification can be authenticated; and when the security context block determines that the first security identification can be authenticated,
reading a firewall control block associated with said second Java compliant applet;
determining whether said firewall control block defines said security identifier as an associate of said second Java compliant applet; and
denying access to said first Java compliant applet when said determining determines that control block does not define said security identifier as an associate.

11. A method as recited in claim 10, wherein said method further comprises:
determining whether said firewall control block defines said operation as an operation that should be allowed when said determining determines that said firewall control block defines said security identifier as an associate; and
granting access to said first Java compliant applet to perform said operation on said second Java™ compliant applet when said determining determines that said firewall control block defines said operation as an operation that should be allowed.

12. A method as recited in claim 11, wherein said method further comprises:
providing a reference to said first Java compliant applet with a reference to said second Java compliant when access is granted.

13. A method as recited in claim 11, wherein said providing of a reference comprises:
invoking a first method that is implemented as a part of Java management (or system) environment; and
invoking a second method that is implemented as an applet class, as a result of said invoking of the second method.

14. A computing environment, comprising:
a virtual machine;
a first application operating on said virtual machine;
a second application operating on said virtual machine;
a security context block that determines whether a first security identification can be authenticated; and
a firewall control block, wherein said firewall control block includes one or more of the following:
a first firewall control block portion, wherein said first firewall control block portion defines access privileges of said first application with respect to said second application, and further defines the access privileges of said second application with respect to said first application,
a second firewall control block portion, wherein said second firewall control block portion includes:
an associate security identification portion that identifies one or more associates of said first application as identified associates, wherein each one of said one or more identified associates has access privilege with respect to said first application;
an access-operations portion that for each one of said one or more identified associates identifies one or more access operations that have been allowed,
wherein the security context block presents the first security identification to the first firewall control block responsive to determining that said first security identification can be authenticated.

15. A computing environment as recited in claim 14, wherein said first firewall control block portion includes a firewall control value and a firewall control indicator.

16. A computing environment as recited in claim 15, wherein said firewall control value is an access privileges control value represented by one or more bytes, and wherein said firewall control value is an indicator value represented by one or more bytes that indicate how the firewall control value should be interpreted with respect to access privileges of other applications.

17. A computing environment as recited in claim 14, wherein said first firewall control block portion includes a plurality of firewall control values and a plurality firewall control indicators.

18. A computing environment as recited in claim 14,
wherein said first firewall control block portion includes first and second firewall control values and first and second firewall control indicators, wherein the first firewall control value and indicator indicate access privileges of said first application to said second application, and
wherein said second firewall control value and indicator indicate access privileges of said second application to said first application.

19. A computing environment as recited in claim 14,
wherein said computing environment is a Java compliant computing environment, and
wherein said first and second applications are Java compliant applets.

20. A computing environment as recited in claim 18,
wherein said computing environment is a Java Card compliant computing environment, and
wherein said first firewall control block is implemented in Java Card run time environment.

21. A computing environment, comprising:
a virtual machine;
one or more applications operating on said virtual machine; and
one or more security context blocks provided for said one or more applications, wherein each of said one or more security context blocks include:
a security identification; and
a cryptographic system that can be used to perform cryptographic operations, wherein said cryptographic operations include cryptographic operations that can be performed on said security identification,
wherein each security context block determines whether a security identification can be authenticated and the respective security context block presents the security identification to a first firewall control block responsive to determining that said security identification can be authenticated.

22. A computing environment as recited in claim 21,
wherein said security identification includes one or more security identifiers have been assigned to said one or more applications, and
wherein said cryptographic system includes:
one or more keys;
one or more key management information that provide information with respect said one or more keys; and
one or more algorithm identifiers that identify what cryptographic algorithm should be used.

23. A computing environment as recited in claim 22, wherein said cryptographic operations include digital signatures, verification, encryption, decryption, and authentication.

24. A computing environment as recited in claim 22, wherein said cryptographic system includes one or more cryptographic operation identifiers that identify one or more cryptographic operations associated with said one or more keys.

25. A computing environment as recited in claim 22, wherein said computing system further includes:

an encryptor that operates to encrypt a first string using one or more of said keys to generate an encrypted string;

a decryptor that operates to decrypt said encrypted string; and a verifier that operates to determine whether the decrypted string can be verified.

26. A computing environment as recited in claim 22, wherein said computing environment farther comprises:

a Java management applet that can operate to authenticate a security identification transmitted.

27. A method of providing security for a Java compliant computing environment that includes a Java virtual machine and a plurality of Java compliant applets that operate on said Java virtual machine, said method comprising:

providing a security context that includes a security identification and a cryptographic system;

receiving from a first Java compliant applet a request to perform an operation on a second Java compliant applet, wherein the request includes a first security identification;

determining whether said first Java compliant applet can be authenticated; and presenting the first security identification to said second Java compliant applet only when said determining determines that said first security identification can be authenticated.

28. A method as recited in claim 27, wherein said determining of whether said first Java compliant applet can be authenticated comprises:

verifying an encrypted string.

29. A method as recited in claim 27, wherein said determining whether said first Java compliant applet can be authenticated comprises:

sending a random string to said first Java compliant applet;

encrypting, by said first Java compliant applet, said random string to generate a encrypted string;

decrypting said random string to generate a decrypted string; and determining whether said decrypted string matches said random string.

30. A method as recited in claim 27, wherein said authentication can be performed without a configuration file.

31. A method as recited in claim 27, wherein said authentication can be performed without user intervention.

* * * * *